Oct. 27, 1953 O. A. WIBERG 2,657,084
ELASTIC CONNECTING DEVICE FOR ELASTIC FLUID MACHINES
Filed May 21, 1948
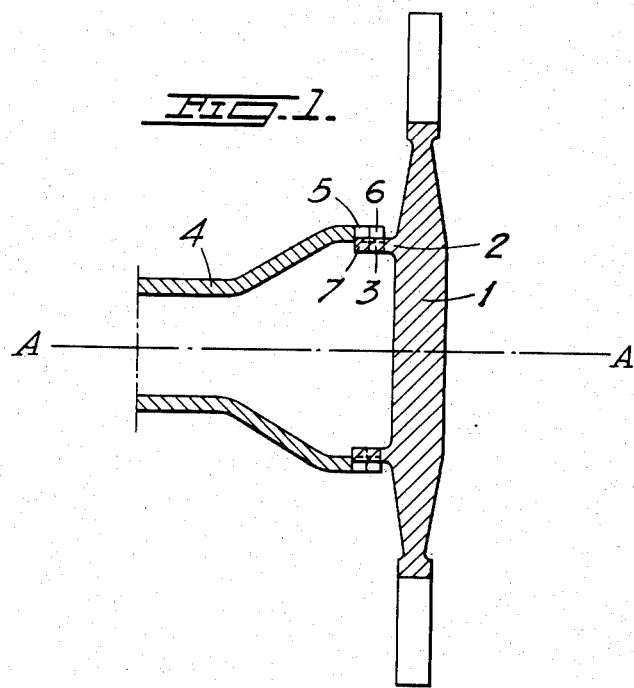
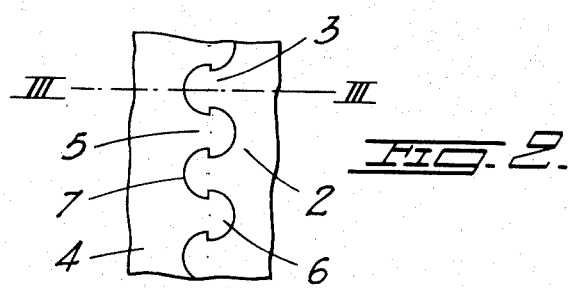
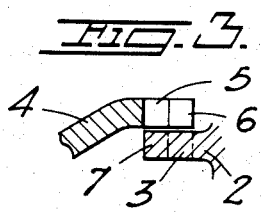
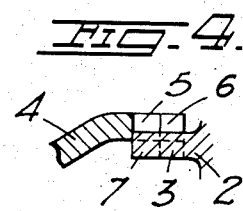
Inventor
Oscar Anton Wiberg
by Sommers & Young
Attorneys Patented Oct. 27, 1953

2,657,084

UNITED STATES PATENT OFFICE 2,657,084

ELASTIC CONNECTING DEVICE FOR ELASTIC FLUID MACHINES

Oscar Anton Wiberg, Finspong, Sweden

Application May 21, 1948, Serial No. 28,354
In Sweden May 29, 1947

1 Claim. (Cl. 287—103)

It is already known in the steam or gas turbine art to connect various members of a turbine by means of elastic or pivoted connecting devices or by means of connecting devices including pins in order to prevent the changes of dimensions due to heating or cooling from causing stresses between the members connected by such devices.

The present invention has for its object to provide a connecting device having no loose elements which is so designed that such changes of dimensions of the connected members which are due to variations of temperature do not interfere with the centering of said members with relation to each other.

The invention is characterized, chiefly, by the fact that the members to be connected are provided with a circular row of coengaging projections which allow radial movements of said members with relation to each other without interfering with the centering thereof, while locking the members against axial and peripheral movements with relation to each other.

In the accompanying drawing a connecting device according to the invention is illustrated by way of example.

Fig. 1 is an axial section of a device according to the invention as used for connecting a turbine disc to a supporting shaft therefor. Fig. 2 is a plan view of a plurality of coengaging projections of such a connecting device on a larger scale. Fig. 3 is an axial section on the line III—III of Fig. 1, showing the connecting device with the projections thereof ready for engagement. Fig. 4 is a similar section showing the projections in partial engagement with each other.

With reference to the drawing the numeral 1 denotes a turbine disc and 2 is an integral annular flange provided on one side thereof which is formed with a series of circumferentially spaced projections 3. A tubular shaft member 4 adapted to support the turbine disc 1 is formed with corresponding projections 5 adapted to fit into between the projections 3 of the disc. The axis of shaft 4 is represented diagrammatically by line A—A. By means of said annular series of projections 3 and 5 the disc may be connected to the shaft in such a way as to be capable of yielding radially with relation thereto, while being locked against peripheral movement with relation to the shaft. In order also to obtain a locking against axial movements of the disc with relation to the shaft the projections 3 and 5 are formed with enlarged heads 6 and 7, respectively, at their free ends, that is to say, said ends are made slightly wider in the peripheral direction. As will appear from Fig. 2, said heads are preferably semicircular in shape.

To mount the disc on the shaft the shaft is heated and/or the disc is cooled, or vice versa, until the difference in temperature obtained is sufficient to cause such a change of the relative diameters of the series of projections 3 and 5 as to allow the series of projections 5 of the shaft to be pushed outside (or as an alternative inside) the projections 3, as shown in Fig. 3. After observing that the projections of any of the members 2 and 4 are in register with the spaces between the projections of the other member, the temperatures are allowed to equalize, thereby restoring the normal diameters of the members with resulting engagement of the projections of each member into the spaces of the other member, as indicated in Fig. 4.

What I claim is:

In an elastic fluid turbine the combination of a turbine disc, a tubular shaft member coaxial therewith, an axially projecting flange on the surface of the turbine disc facing the end of said shaft member, said annular flange and the end of said shaft member being normally of the same diameter and both being coaxial with the turbine disc and shaft, the opposing edges of said flange and said shaft member each being formed with at least three circumferentially spaced projections of such a shape as to allow the projections of each of said edges to fit snugly in the spaces between the projections of the opposite edge for locking the turbine disc and the shaft member against rotary movements with relation to each other, the projections having circumferentially enlarged heads and the spaces between them having similarly enlarged portions for receiving the heads of the respective projections with a resulting locking of the turbine disc and the shaft member against axial movements with relation to each other, while allowing a relative change of the diameters of the flange of the turbine disc and the shaft member sufficient for bringing their projections into interlocking mesh with each other.

OSCAR ANTON WIBERG.

References Cited in the file of this patent

UNITED STATES PATENTS

| Number | Name | Date |
|---|---|---|
| 438,822 | Philion | Oct. 21, 1890 |
| 693,247 | Edwards | Feb. 11, 1902 |
| 1,006,661 | Knapp | Oct. 24, 1911 |
| 1,314,601 | McCaskey | Sept. 2 1919 |
| 1,919,455 | Wilson | July 25, 1933 |
| 2,198,167 | Harman | Apr. 23, 1940 |
| 2,418,967 | Clark | Apr. 15, 1947 |
| 2,445,661 | Constant et al. | July 20 1948 |